United States Patent
Bär et al.

(10) Patent No.: US 6,724,517 B2
(45) Date of Patent: Apr. 20, 2004

(54) DEFORMABLE MIRROR

(75) Inventors: Klaus Bär, Lauf (DE); Berndt Warm, Schwaig (DE)

(73) Assignee: Diehl Munitionssysteme GmbH & Co. KG, Röthenbach (DE)

(*) Notice: Subject to any disclaimer, the term of this patent is extended or adjusted under 35 U.S.C. 154(b) by 0 days.

(21) Appl. No.: 10/315,679

(22) Filed: Dec. 10, 2002

(65) Prior Publication Data

US 2003/0107796 A1 Jun. 12, 2003

(30) Foreign Application Priority Data

Dec. 12, 2001 (DE) .......................... 101 60 893

(51) Int. Cl.[7] .............................. G02B 26/00; G02B 5/08
(52) U.S. Cl. ................... 359/291; 359/240; 359/846; 359/847
(58) Field of Search ................... 359/290, 291, 359/238, 846, 847, 849

(56) References Cited

U.S. PATENT DOCUMENTS 6,193,381 B1 * 2/2001 Holler ...................... 359/849
6,236,490 B1 * 5/2001 Shen ......................... 359/247

FOREIGN PATENT DOCUMENTS

DE         35 02 025 A1    7/1986

* cited by examiner

Primary Examiner—Georgia Epps
Assistant Examiner—Tim Thompson
(74) Attorney, Agent, or Firm—Scully, Scott, Murphy & Presser

(57) ABSTRACT

A deformable mirror (10) with an at least quasi-continuously deformable optically effective surface (12) has a floatingly supported mirror plate (11) which is positioned along its edge by a portion of the adjusting members (14.1), whereas the other portion of the adjusting members (14.2) locally individually deforms the mirror plate (11) for the purposes of wave front correction. In that respect all adjusting members (14.1, 14.2) are fixed to the rear side (13) of the mirror plate (11), with a coupling portion (11) which is provided with a desired-flexion location (constriction (25)).

10 Claims, 1 Drawing Sheet

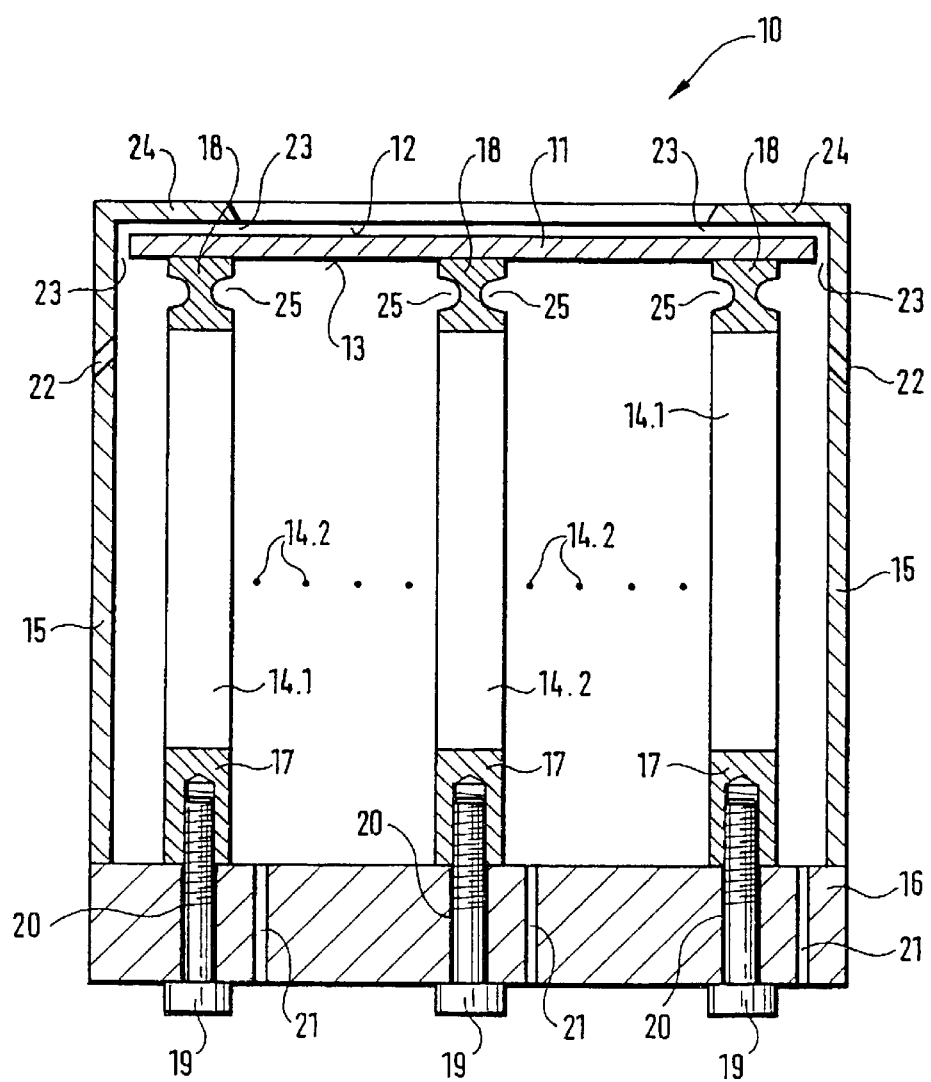

DEFORMABLE MIRROR

BACKGROUND OF THE INVENTION

1. Field of the Invention

The invention concerns a deformable mirror having an at least quasi-continuously deformable optical effective surface, and a plurality of electrically actuable adjusting members which engage behind the surface and which are arranged in a housing.

2. Discussion of the Prior Art

A mirror of the general kind set forth is known from DE 35 02 025. Formed on the rear side of the mirror are projections which permit punctiform engagement for adjusting members. Those projections are permanently connected to the adjusting members by way of a sleeve which transmits a variation in the length of the adjusting member to the mirror plate by pulling or pushing. The mirror plate itself is held by way of a peripherally extending rubber seal in an end flange of a hollow cylinder. The hollow cylinder at its rear carries a support for the adjusting members.

That design configuration has basically proven its worth for compensating for phase differences of an incident wave front. However, the elastic fixing of the mirror plate to the housing has proven to be disadvantageous in a practical situation, for the adjustment requirements. Thus, as the adjusting members are to be clamped between the mirror plate and the support, the arrangement can involve local deformation of the mirror plate which in that case is partially displaced out of the zero or neutral position or the working point. As a consequence of this, that structure then lacks a flat mirror surface as a reference for corrections.

SUMMARY OF THE INVENTION

In consideration of those factors the technical object of the present invention is therefore that of providing a deformable mirror of the general kind set forth, the mirror plate of which is so mounted that it can be set with its predetermined planarity to a working point, around which local actuating control actions are then implemented.

In accordance with the invention that object is attained in that the mirror plate is supported in a contactless manner to an open end face of the housing along its edge by a group of at least three adjusting members. In accordance therewith the deformable mirror designed in accordance with the invention comprises a deformable mirror plate in front of a housing, wherein the optically effective surface of the mirror plate faces away from the housing. At the housing side, behind the optically effective surface, a group of electrically-actuable adjusting members engages the rear side along the edge of the mirror plate and holds same in contact-free relationship with respect to the housing in front of the open end face thereof. For that purpose, at least three adjusting members which are not disposed on a line are arranged along the edge of the mirror plate in space by means of electrical actuation. Besides those adjusting members along the edge, which function as a holder and for working point adjustment, a group of adjusting members is arranged in distributed fashion over the rear side of the mirror plate, which adjusting members can implement deformation of the mirror plate at each respective location, namely around the stationary length presetting of the adjusting member outwardly or inwardly.

A coupling portion in front of each adjusting member is permanently fixedly connected, for example by adhesive means, to the adjusting member and to its end remote from the adjusting member, at the rear side of the mirror. Preferably the adjusting members of piezo-ceramic material in ring form are stacked to form columns. In order to achieve continuous deformation of the mirror plate, the front coupling portions each have a constriction which acts as a desired-flexion location and thus prevents a blatant stepped transitional configuration of the mirror plate between the deflections of adjacent adjusting members.

In addition also permanently mounted to each adjusting member at the rearward part thereof is a holding portion provided with a female screwthread. By means of a screw, it is possible to fix a respective adjusting member to a base component which represents the rearward closure of the housing, in front of the front end of which the mirror plate is disposed. Besides holding holes for the screws, that base component has an equal number of through holes for actuating cables leading to the adjusting members. For fixing each adjusting member on the base component, referred to in the optical construction art as the tube, a screw engages with its shank through a holding hole and into the female screwthread of the holding portion so that the base component is axially clamped between the rearward screw head and the holding portion which is disposed in front of same. In that way the adjusting member is held in front of the base component.

BRIEF DESCRIPTION OF THE ACCOMANYING DRAWINS

Additional developments and further features and advantages of the invention will be apparent from the further claims and from the description hereinafter of a preferred embodiment of the structure according to the invention, which is diagrammatically shown in the drawing in very abstracted form, being limited to what is essential, and not entirely true to scale. The single FIGURE of the drawing shows a view in axial longitudinal section of a deformable mirror through the housing thereof.

DETAILED DESCRIPTION OF A PREFERRED EMBODIMENT

The deformable mirror 10 shown in the drawing has a quasi-continuously deformable mirror plate 11 with an optically effective surface 12. Two groups of a plurality of electrically actuable adjusting members 14.1 and 14.2 respectively engage a rear side 13 of the mirror plate 11. The individual adjusting member 14.2 or the two adjusting members 14.1 which are shown in the drawing are representative of a multiplicity of adjusting members 14.1 and 14.2 respectively. The groups of adjusting members 14.1 and 14.2 are surrounded for protection purposes by a housing 15 in the form of a hollow cylinder. One of the end faces of the housing 15 rests on a base component 16, the so-called tube, which is formed from a solid plate. In front of the oppositely disposed open end face of the housing 15, the mirror plate 11 is held at a spacing relative to the housing 15. The mirror plate 11 and the housing 15 are thereby separated from each other by a thin, peripherally extending slot 23 which further extends between the mirror plate 11 and the aperture member 24 which is disposed in front thereof and which is fixed with respect to the housing (as can be seen at top left and top right in the drawing).

In a particularly advantageous embodiment the mirror plate 11 is in the form of a composite plate comprising substantially copper, about 2% nickel and some silicon. The Cu—Ni—Si alloy used has the advantage that on the one hand this guarantees good thermal conductivity in the mirror plate 11 and on the other hand a mechanically stronger structure than in the case of conventional "laser brass", whereby a higher level of fatigue strength of the mirror plate 11 in relation to its local oscillating loading is achieved.

In a particularly advantageous manner the optically effective surface 11 is applied by a galvanic coating on the mirror plate 11 with copper, which can easily be machined by milling, which does not apply in regard to the composite plate itself.

A respective rear holding portion 17 which is carried on the base component 16 and a front coupling portion 18 are permanently connected, preferably by adhesive means, to the adjusting members 14.1 and 14.2. In order to avoid differing temperature expansion characteristics in respect of the housing 15, the base component 16, the front coupling portion 18 and the holding portion 17 and thus to avoid stresses occurring in the mirror 10, which would result in distortion of the mirror surface, those component parts are made from the identical Cu—Ni—Si material, as the mirror plate 11. At the rear side 13 of the mirror plate 11, the front coupling portions 18, as already mentioned above, are also permanently connected thereto so that the mirror plate 11 itself is carried by the adjusting members 14.1 by means of the front coupling portions 18 fixed thereto, or is supported in the region of the opening of the housing 15. It is provided that at least three adjusting members 14.1 which are arranged along a ring in the edge region of the mirror plate 11 opposite the aperture member 24 are used exclusively for holding same and for basic setting thereof. Those adjusting members 14.1 which function as holders provide that the mirror plate 11 which forms a flat surface is set for example perpendicularly to the housing wall 15 and thus parallel to the base plate 16, more specifically in such a way that the static setting thereof is for example at 50% of the maximum stroke movement of the adjusting members 14.1. In that situation the mirror plate 11 does not involve any contact with the housing 15 and the aperture member 24, whereby on the one hand thermal decoupling of the mirror plate 11 from the housing 15 is achieved, while on the other hand avoiding mechanical stresses which act on the housing 15 being transmitted to the stress-sensitive mirror plate 11. The adjusting members 14.1 hold the mirror plate 11 invariably during operation of the mirror 10 in the set position as the working point. In that respect the edge region is determined by an aperture member 24 which engages in an annular configuration over the side of the optically effective surface 12.

In contrast to the adjusting members 14.1 which are disposed in the edge region and which keep their length constant in operation of the mirror, the adjusting members 14.2 which are at the centre of the mirror plate 11 provide that phase differences in the wave front which is incident on the optically effective surface 12 are locally compensated, which is implemented by individual actuation of the adjusting members 14.2 for increasing or reducing the length thereof, thus to provide for local deformation of the mirror plate 11. For that purpose the adjusting members 14.2 are permanently fixed, for example by adhesive means, to the rear side 13 of the mirror, for example by way of the coupling portions 18 of the adjusting members 14.2.

The mirror plate 11 is therefore set by means of the edge group 14.1 to a 50% maximum stroke movement and the adjusting members 14.2 also initially experience that basic actuation of 50%, so that the mirror plate 11 is initially still flat. Then, local deformation is effected by actuating the respective adjusting member 14.2 to a greater or lesser degree, around that basic setting, in order to locally convexly or concavely deform the optically effective surface 12.

In its preferred embodiment the adjusting members 14.1 and 14.2 are formed by stacking rings of piezo-ceramic material. If a pulling force or a pressing force is applied to the mirror plate 11 by virtue of a variation in length of an adjusting member 14.2 and the mirror plate 11 is thereby locally deformed, the mirror plate 11 then reacts as a result of its local curvature with a torque on the adjusting member 14.2, which can result in the adjusting member being bent and then breaking by virtue of the flexural forces acting within the ceramic material. In order to carry the flexural forces acting on the adjusting members 14.2 and 14.1 respectively from the mirror plate 11 and thereby to avoid the breakage thereof, the front coupling portions 18 have constrictions 25 which function as desired-flexion locations. Due to their bending, the front coupling portions 18 absorb the flexural forces which otherwise act on the adjusting members 14.1 and 14.2 respectively, and thus prevent destruction of the adjusting members 14.1 and 14.2 which are in the form of piezo columns. In that way, the constriction 25 in the front coupling portions 18 at the same time provides that there is a continuous transition in the optically effective surface 12 between different lengths of stroke movement of adjacent adjusting members 14.2.

At the side of the adjusting members 14.1 and 14.2, which is remote from the mirror plate 11, the adjusting members are each permanently connected, preferably also by adhesive, to a respective rear holding portion 17. For fixing purposes, the rear holding portions 17 have female screwthreads. By means of screws 19 whose shanks engage through holding holes 20 in the base component 16, the rear coupling portions 17 and therewith also the adjusting members 14.1 and 14.2 respectively are fixed to the base component 16, insofar as, on the opposite side of the base component, the holding portions 17 are axially braced against the heads of the screws 19. Disposed beside each holding hole 20 is a through hole or passage 21 through which the control lines (not shown) of each adjusting member 14.1 and 14.2 are passed.

So that the energy which is introduced when the optically effective surface 12 of the mirror 10 is subjected to the action of a high-energy laser acting on the mirror plate 11 can be better dissipated, the deformable mirror 10 can be cooled. A particularly advantageous dual-circuit cooling system is provided for that purpose. In this case, a first cooling circuit is formed by the base component 16 and the housing 15 which are coupled to an ordinary cold reservoir (not shown). The housing 15, or at any event its base component 16, are for that purpose provided with passages passing therethrough or are surrounded by fluid conduits which bear thereagainst and through which the cooling medium flows. At the same time the base component 16 can be acted upon with cooling gas, such as for example nitrogen, through the second circuit "from below", more specifically from outside the housing 15. The cooling gas loses thermal energy upon contact of the gas molecules with the base component 16 and penetrates through the through holes 21 into the internal space of the housing 15, which accommodates the adjusting members. With a steady gas feed through the through holes 21 which are distributed uniformly in the base component 16, the interior of the housing 15 is filled with cooling gas which absorbs the thermal energy introduced into the mirror plate 11 by the laser beam.

Provided in the housing 15 are a plurality of main blow-out openings 22 through which the cooling gas which is disposed in the interior of the housing under an increased pressure can escape. The main blow-out openings 22 are so oriented in the housing 15 that the escaping gas is deflected away from the mirror plate 11 so that the laser beam reflected on the optically effective surface 12 is not influenced by the flow of gas.

As described above, the mirror plate 11 is supported in such a way that it does not entail any mechanical contact with the housing 15 and the aperture member 24. It is however provided that there is a small spacing between the mirror plate 11 and the housing 15 or the aperture member 24 so that a thin blow-out slot 23 is formed between the mirror plate 11 and the aperture member 24 of the housing 15. Small amounts of cooling gas are blown past the aperture member 24 out of the interior of the housing 15 through that blow-out slot 23, and moreover an increased-pressure cushion is built up in the slot 23, which prevents small foreign bodies from penetrating past the aperture member 24 into the interior of the housing 15. At the same time this arrangement still ensures that the mirror plate 11 is decoupled from the thermal characteristics of the housing 15 and from mechanical stresses acting on the latter.

Thus in accordance with the invention a deformable mirror 10 with an at least quasi-continuously deformable optically effective surface 12 has a floatingly supported mirror plate 11 which is positioned along its edge by a portion of the adjusting members 14.1, whereas the other portion of the adjusting members 14.2 locally individually deforms the mirror plate 11 for the purposes of wave front correction. In that respect all adjusting members 14.1, 14.2 are fixed to the rear side 13 of the mirror plate 11, with a coupling portion 11 which is provided with a desired-flexion location (constriction 25).

What is claimed is:

1. A deformable mirror (10) having an at least quasi-continuously deformable optically effective surface (12) and a plurality of electrically actuable adjusting members (14.1, 14.2) which engage behind its surface (12) and which are arranged in a housing (15), characterised in that the mirror plate (11) is supported in contact-free manner at an open end face of the housing (15) along its edge by a group of at least three adjusting members (14.1), a slot being provided between the mirror plate (11) and the housing (15) or an annular aperture member (24) in the edge region of said mirror plate (11), said slot (23) being in the form of a gap for the discharge of a small amount of cooling fluid which has been introduced into the interior of the housing (15) and which moreover is blown out of the housing (15) through an opening (22) which is directed in such a way that laser beam reflection on the mirror surface (12) is not influenced by the departing fluid.

2. A mirror according to claim 1 characterised in that a front coupling portion (18) is inserted between the rear side (13) of the mirror plate (11) and each adjusting member (14.1, 14.2) and permanently connected to both.

3. A mirror according to claim 2 characterised in that the front coupling portion (18) has a constriction (25) as a desired-flexion location.

4. A mirror according to claim 3 characterised in that each adjusting member (14.1, 14.2) is permanently connected to a rear holding portion (17).

5. A mirror according to claim 4 characterised in that each rear holding portion (17) is provided with a female screwthread.

6. A mirror according to claim 4 characterised in that the permanent connections are made by adhesive.

7. A mirror according to claim 6 characterised in that a base component (16) is in the form of a solid plate on which the housing (15) is arranged in the form of a hollow cylinder and which has holding holes (20) through which screw shanks engage into the rear holding portions (17).

8. A mirror according to claim 7 characterised in that the rear holding portions (17) are axially braced by means of the screw shanks against screw heads on the oppositely disposed side of the solid plate-shaped base component (16).

9. A mirror according to claim 1 characterised in that the adjusting members (14.1, 14.2) are in the form of piezo-columns.

10. A mirror according to claim 1 characterised in that the peripherally extending edge region of the mirror plate (11) is determined by having said aperture member (24) fixed with respect to the housing engaging radially thereover.

\* \* \* \* \*